United States Patent [19]

Kadlicko et al.

[11] Patent Number: 5,522,221

[45] Date of Patent: Jun. 4, 1996

[54] ACTIVE SUSPENSION SYSTEM

[75] Inventors: George Kadlicko, Mississauga; Will Halina, Toronto, both of Canada

[73] Assignee: Microhydraulics Inc., Ontario, Canada

[21] Appl. No.: 196,400

[22] Filed: Feb. 15, 1994

Related U.S. Application Data

[60] Division of Ser. No. 929,242, Aug. 13, 1992, Pat. No. 5,299,488, which is a continuation-in-part of Ser. No. 741,542, Aug. 7, 1991, abandoned.

[51] Int. Cl.⁶ .................................................. F16D 31/02
[52] U.S. Cl. .......................... 60/413; 91/5; 91/417 R; 92/5 R; 92/134
[58] Field of Search ........................ 60/413, 415, 416, 60/417, 408; 91/5, 417; 92/134, 5 R

[56] References Cited

U.S. PATENT DOCUMENTS

| | | | |
|---|---|---|---|
| 269,301 | 12/1882 | Livingston et al. | 91/438 |
| 2,257,203 | 9/1941 | Thacker | 91/51 |
| 2,379,304 | 6/1945 | Kalin | 91/417 R |
| 2,939,653 | 6/1960 | Rasmussen et al. | 91/367 |
| 2,995,014 | 8/1961 | Horky et al. | 91/433 |
| 3,048,016 | 8/1962 | Buechner | 60/416 |
| 3,126,031 | 3/1964 | Hayner | 91/51 |
| 3,186,169 | 6/1965 | Hauser | 91/5 |
| 3,842,603 | 10/1974 | Ditzen | 60/416 |
| 3,971,215 | 7/1976 | Baron et al. | 60/416 |
| 3,984,648 | 10/1976 | Nakano et al. | 91/417 R |
| 4,065,094 | 12/1977 | Adams | 60/416 |
| 4,590,763 | 5/1986 | Augoyard et al. | 60/416 |
| 4,796,428 | 1/1989 | Hall | 91/417 R |
| 4,867,476 | 9/1989 | Yamanaka et al. | |
| 4,969,487 | 11/1990 | Suzuki et al. | |

FOREIGN PATENT DOCUMENTS

| | | | |
|---|---|---|---|
| 0193744 | 5/1986 | European Pat. Off. | |
| 0300496 | 7/1988 | European Pat. Off. | |
| 0424784 | 10/1990 | European Pat. Off. | |
| 2401012 | 10/1974 | Germany | 60/416 |
| 2409523 | 9/1975 | Germany | |
| 3306205 | 8/1984 | Germany | 92/5 R |
| 3638574 | 5/1988 | Germany | |
| 1090674 | 11/1967 | United Kingdom | |
| WO89/00512 | 1/1989 | WIPO | |
| WO90/12700 | 11/1990 | WIPO | |

*Primary Examiner*—F. Daniel Lopez
*Attorney, Agent, or Firm*—Bell, Seltzer, Park & Gibson

[57] ABSTRACT

An actuator for use in an active suspension system is controlled by a valve responsive to differential pressure across the piston of the actuator. The valve operates to allow movement of the piston so as to reduce the pressure differential. The valve is also controlled by signals indicative of position of and load applied to the actuator.

28 Claims, 15 Drawing Sheets

1

ACTIVE SUSPENSION SYSTEM

This application is a divisional of application Ser. No. 07/929,242, filed Aug. 13, 1992, now U.S. Pat. No. 5,249, 488 which is a Continuation-in-Part of U.S. application Ser. No. 07/741,542, filed Aug. 7, 1996 now abandoned.

This present invention relates to hydraulic actuators and particularly, although not exclusively, to such actuators for use in suspension systems of vehicles.

Conventional vehicle suspension systems include wheels that are mounted on suspension elements that move relative to the vehicle body to absorb irregularities in the road. The conventional way of permitting movement is to utilize a spring acting between the body and the suspension element and to control the dynamic response of the sprung mass system by means of a damper.

In more recent years, attention has turned to so-called active suspension units in which movement of the wheel relative to the vehicle is controlled through hydraulic actuators whose movement is regulated according to the forces imposed on the vehicle. Certain active suspension systems utilize only a hydraulic actuator between the vehicle body and wheel, whereas others utilize a spring in parallel with the hydraulic actuator but with the actuator controlling movement of the wheel.

The actuator has to be responsive to a number of inputs and also operate over a wide range of frequencies. At the same time, the actuator must be durable and economical to manufacture.

Active suspension systems must allow movement of the wheel relative to the vehicle to accomodate undulations in the road surface as they occur. Failure to do this effectively provides no suspension for the vehicle. There are a number of ways of providing relative movement between the wheel and vehicle, including systems utilizing sonar sensors and accelerometers to control the fluid supplied to the hydraulic actuator. Usually, such actuators are controlled electronically through appropriately-operated valves which receive signals from a microprocessor monitoring a number of detectors on the vehicle. Such systems therefore provide a number of interfaces and require sensors to detect each of the conditions to which the actuator must respond. As such, they are necessarily complicated systems and their response characteristics are not always adequate.

In general terms, the present invention provides a hydraulic actuator suitable for use in controlling movement of a vehicle wheel relative to the vehicle body in which movement of the piston within the cylinder of the actuator is controlled by a valve responsive to the pressure differential across the piston. Upon sensing an increase in pressure on one side of the piston relative to the other, the valve is operated to equalize the pressure differential. The increase in pressure differential is interpreted as being due to an attempt to move the wheel relative to the body and therefore the valve allows such movement under controlled conditions.

An embodiment of the invention will now be described by way of example only, with reference to the accompanying drawings, in which FIG. 1 is a schematic representation of a vehicle suspension system;

Figure 3:
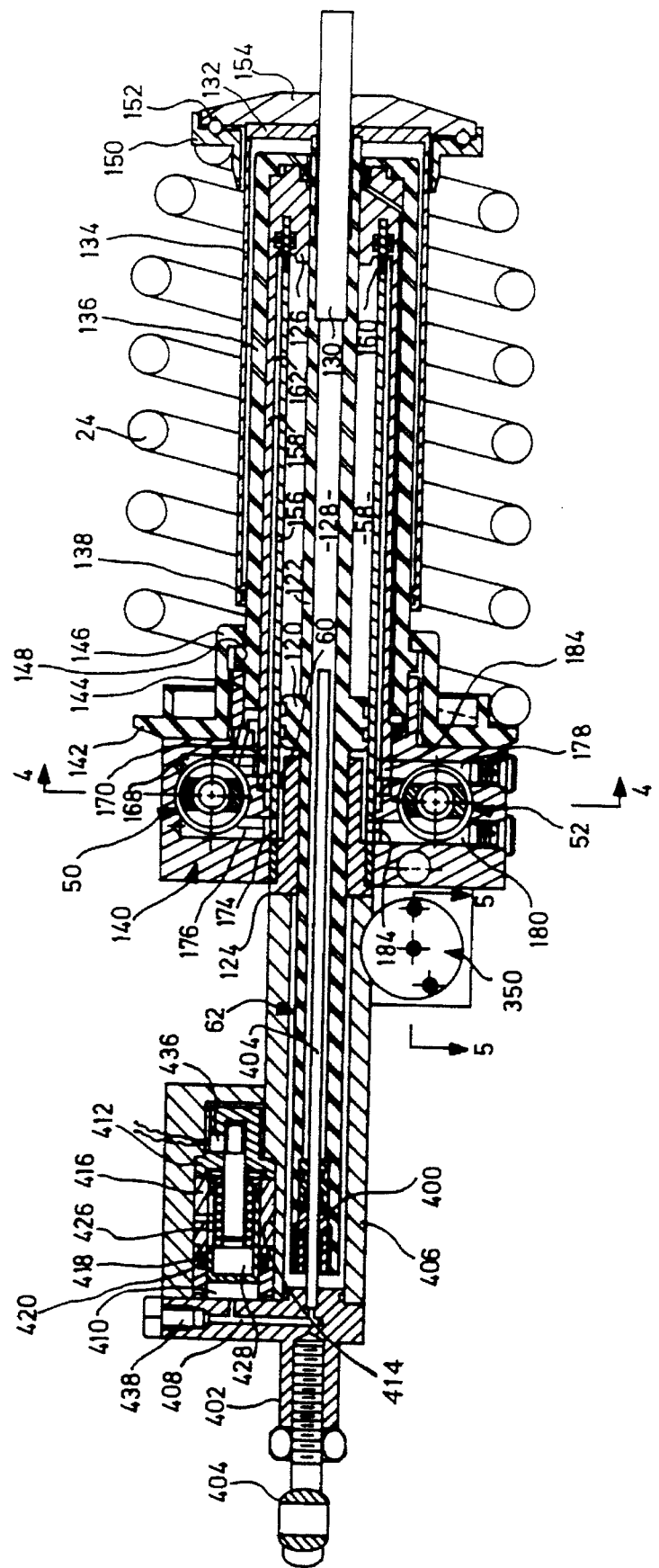
FIG. 3 is a sectional view of the actuator shown in FIG. 2.
Figure 5:
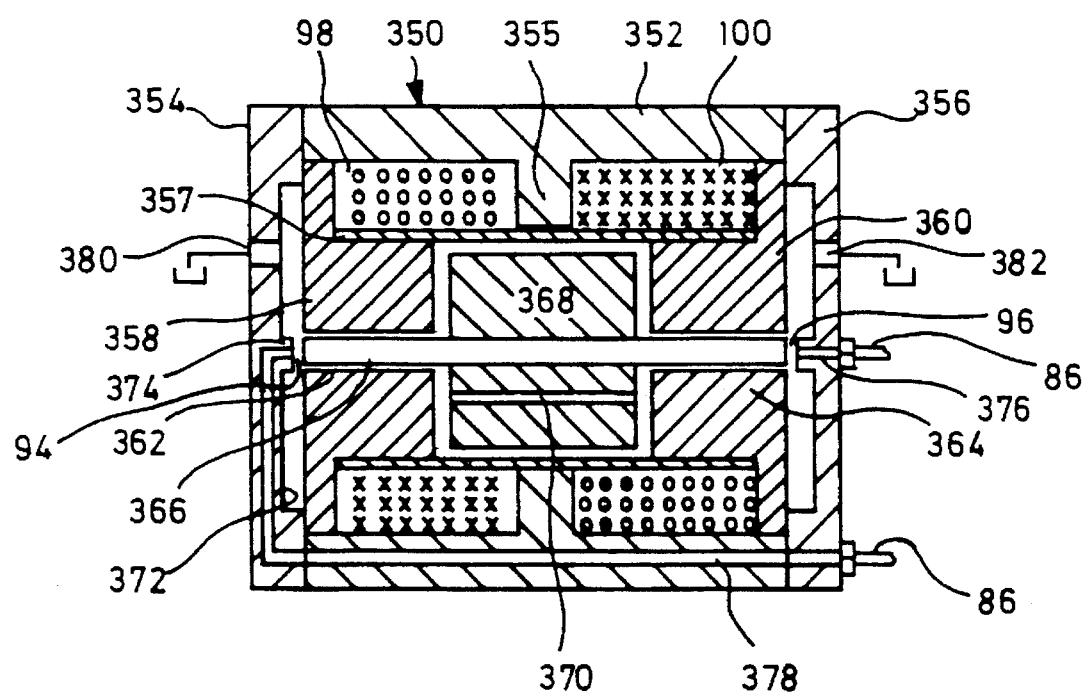

FIG. 5 a sectional view on the line 5—5 of FIG. 3; and

Figure 1:
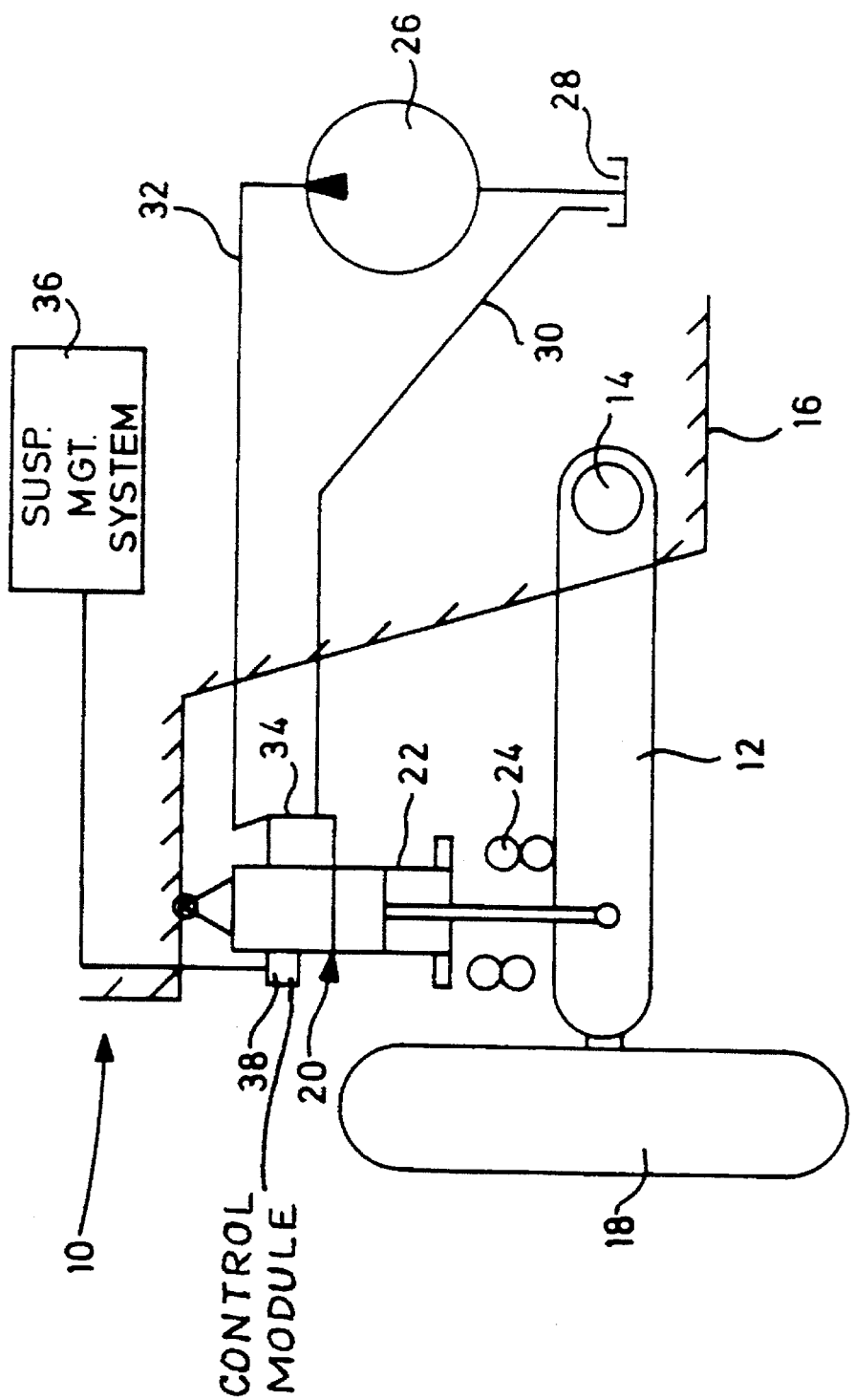
Figure 6:
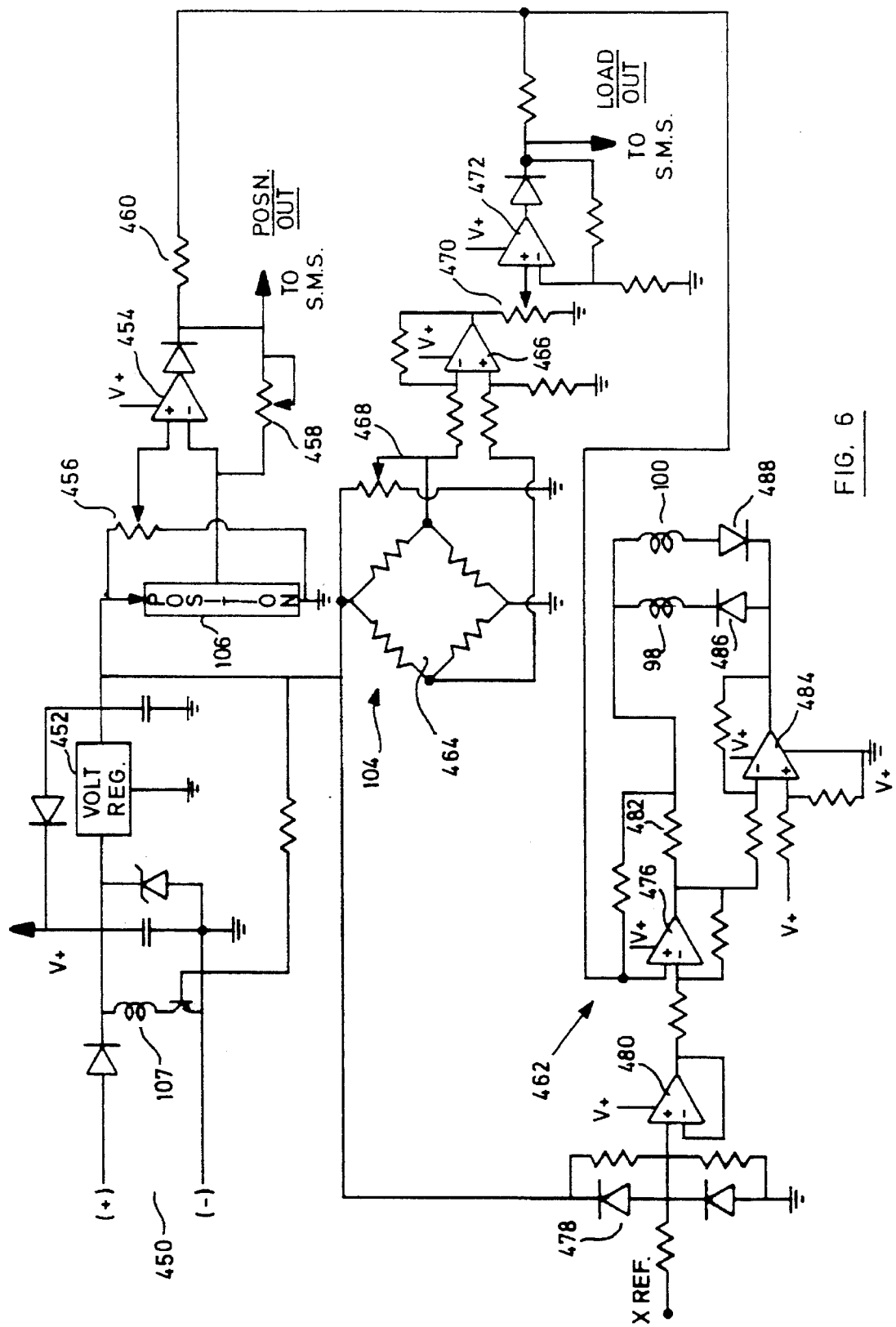

FIG. 6 is a schematic representation of an electronic control system utilized in the suspension system of FIG. 1.

Figure 4:
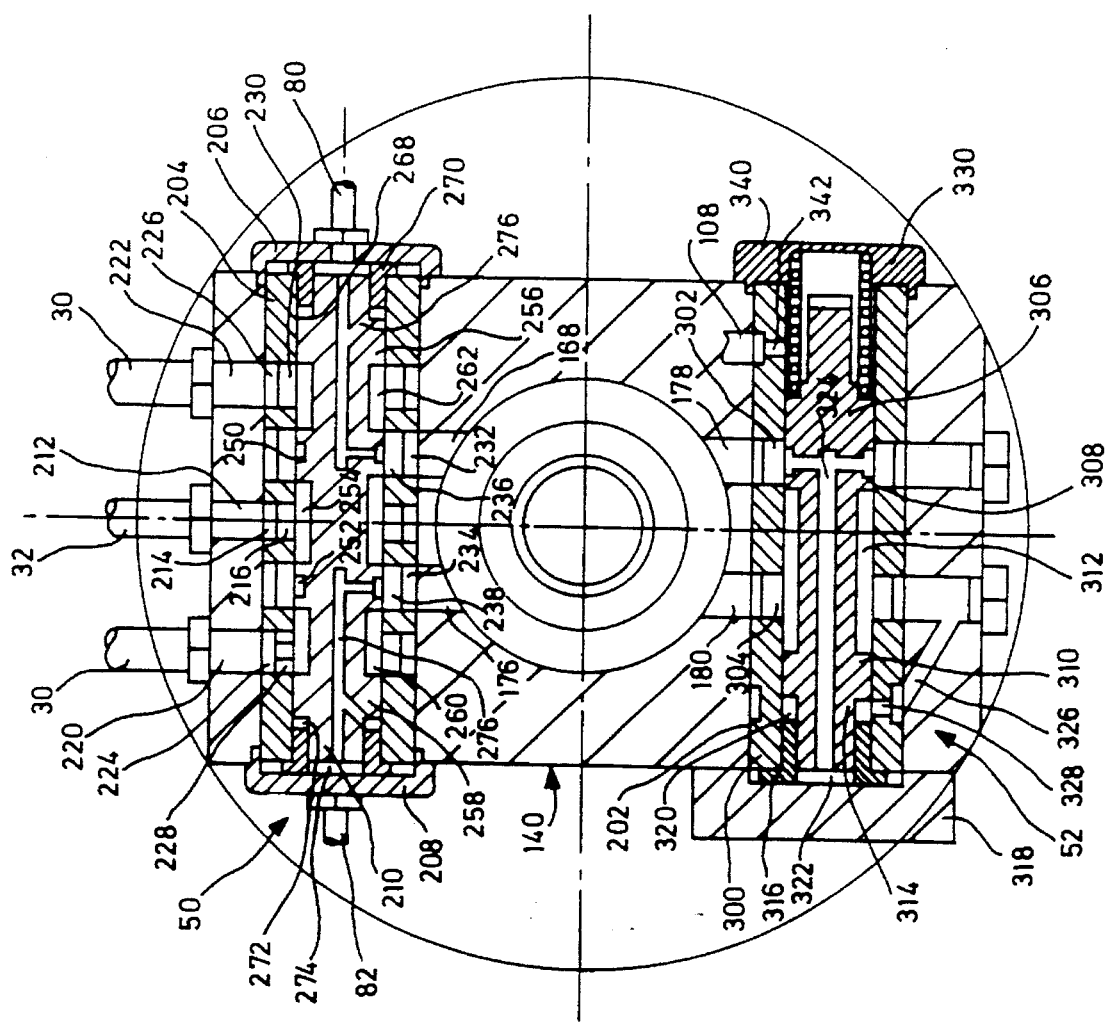
FIG. 4 is a sectional view on the line 4—4 of FIG. 3.
Figure 7:
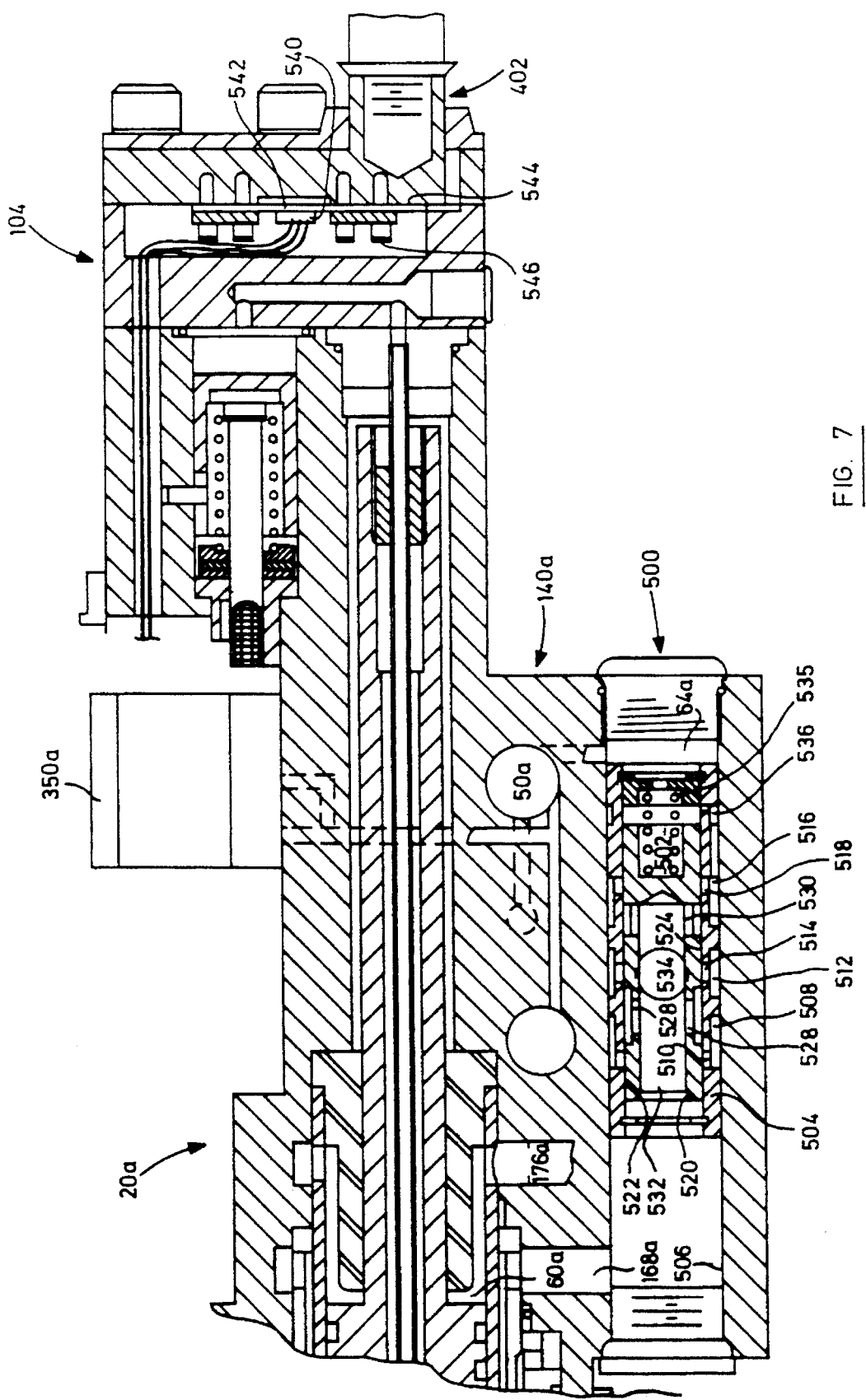

FIG. 7 is a view on an enlarged scale of a portion of an actuator similar to that shown in FIGS. 3 and 4 but illustrating an alternative embodiment of the invention.

Figure 8:
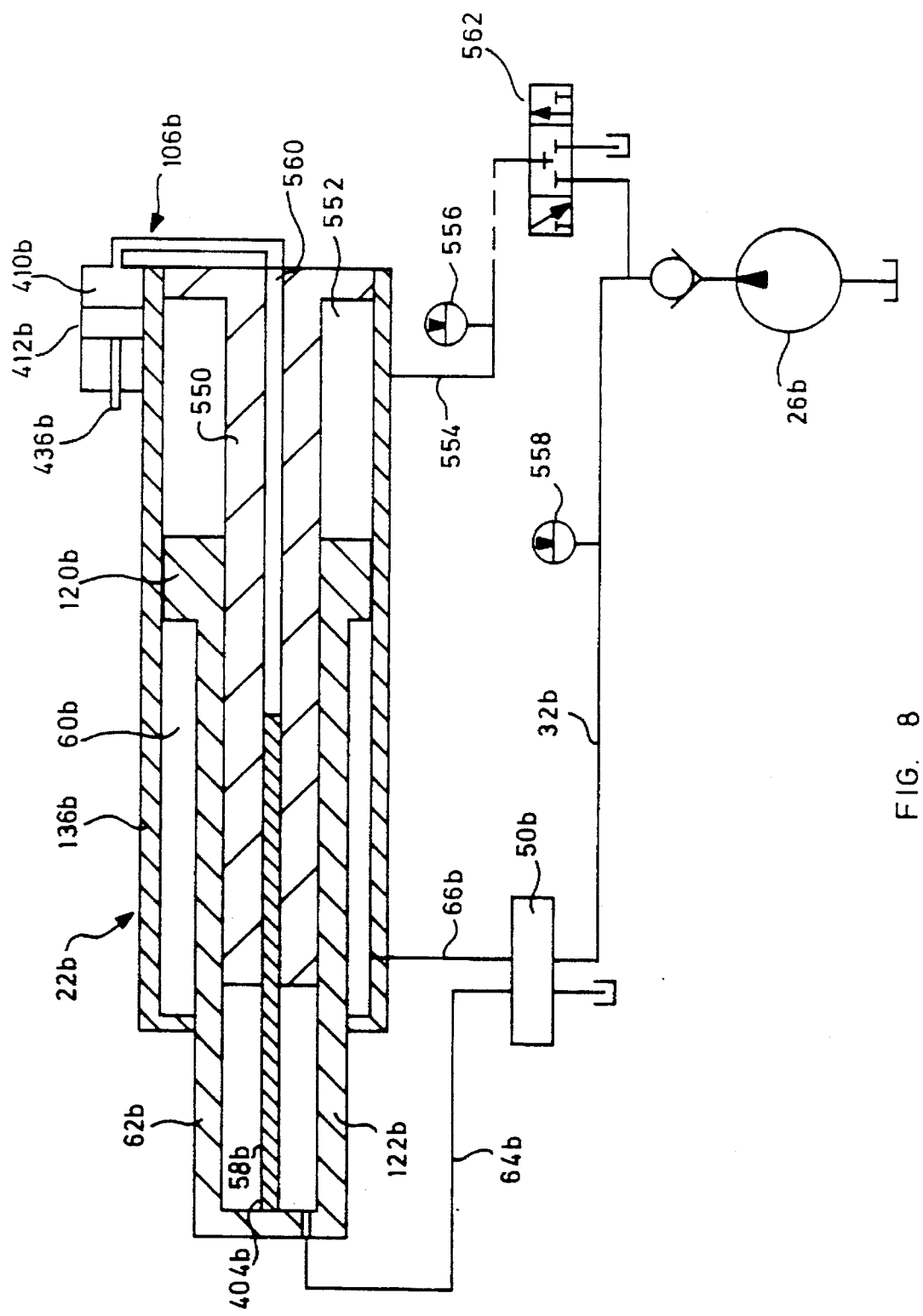

FIG. 8 is a schematic representation of an alternative embodiment of actuator in which a spring is incorporated within the actuator.

Figure 9:
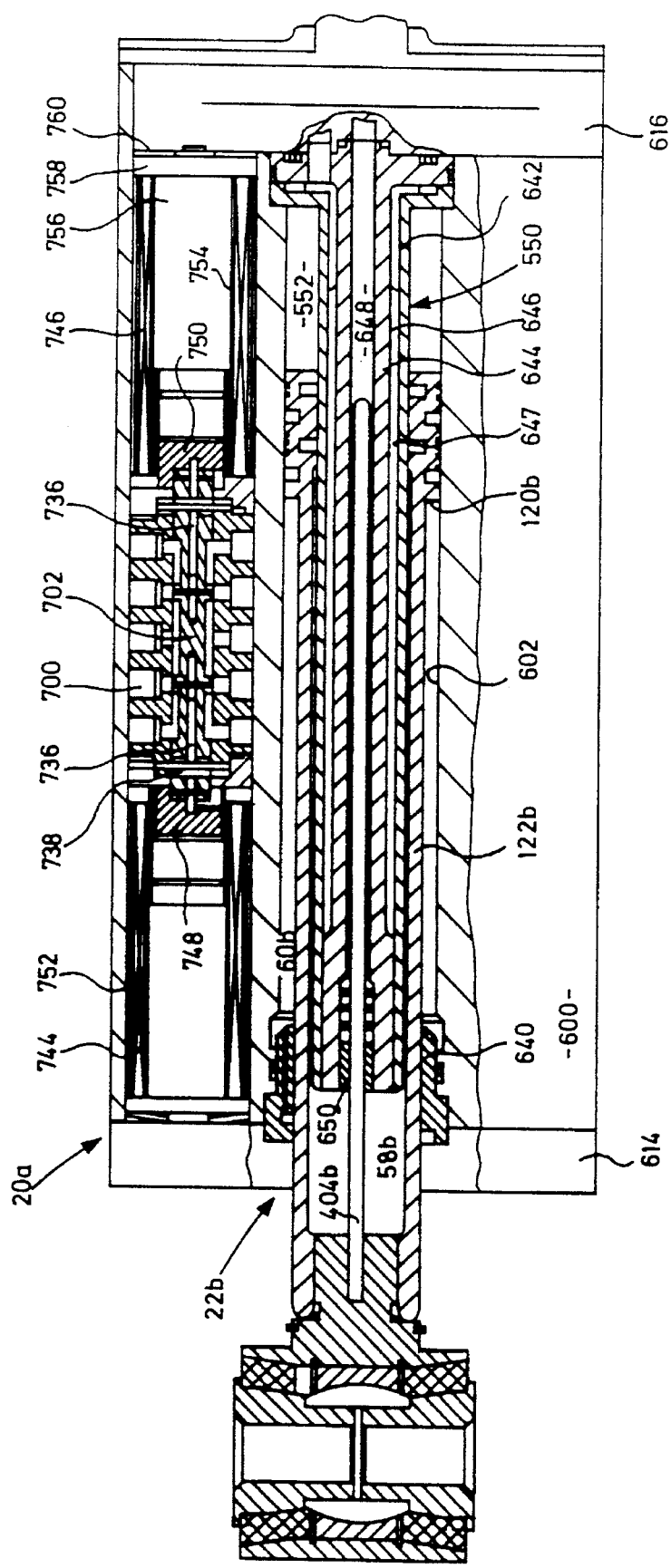

FIG. 9 is a sectional view of the actuator shown in FIG. 8.

Figure 10:
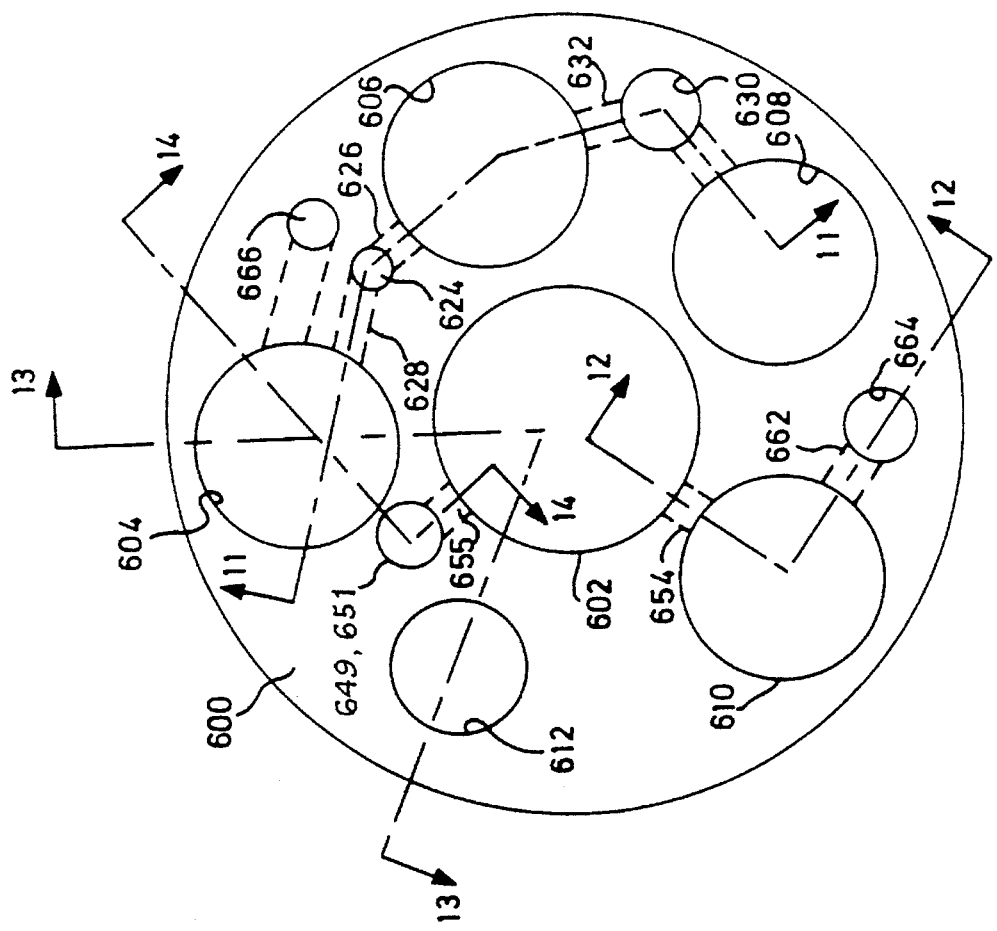

FIG. 10 is a transverse view of the actuator body as seen in FIG. 9.

Figure 11:
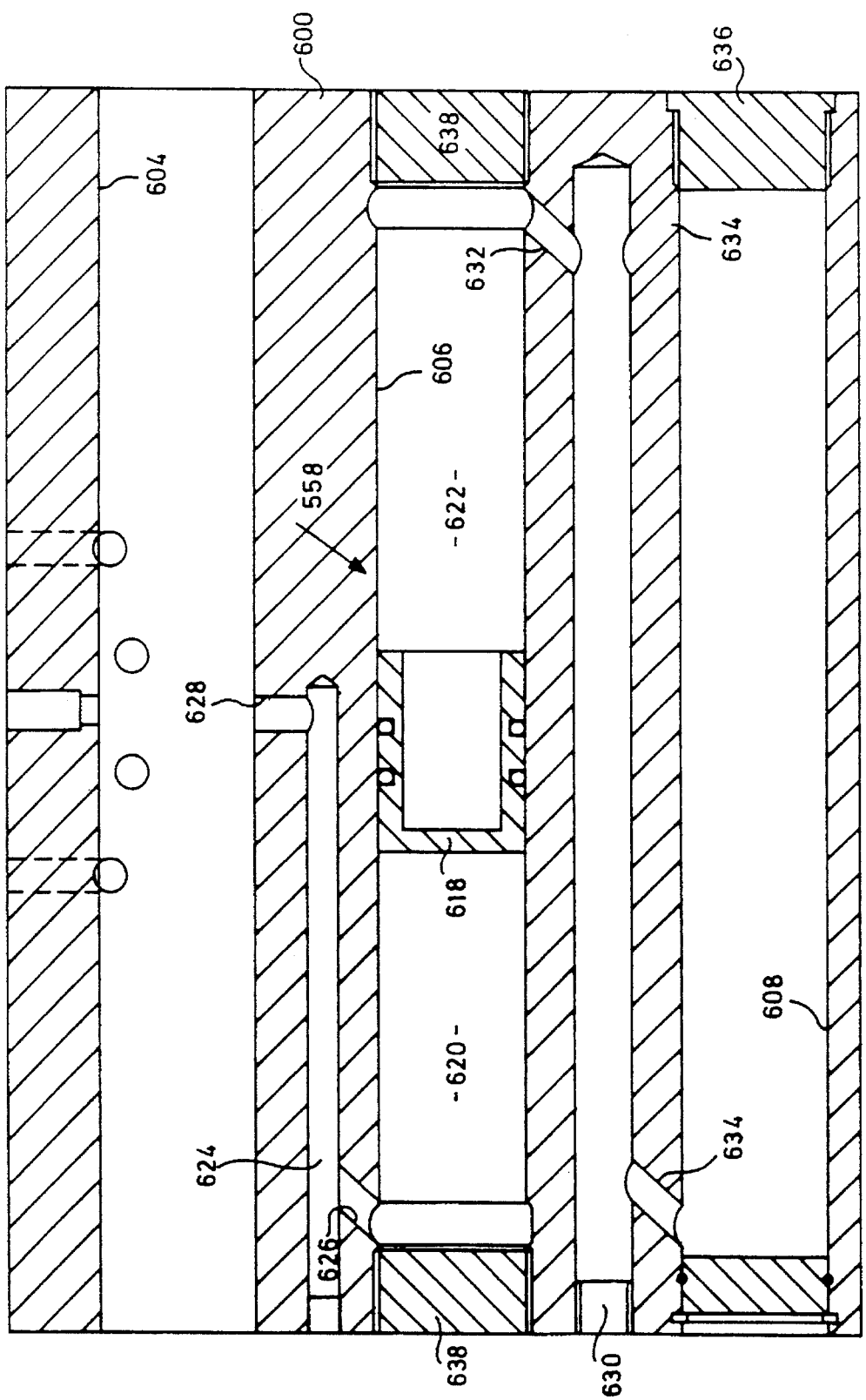

FIG. 11 is a view on the line 11—11 of FIG. 10 showing details of the actuator body.

Figure 12:
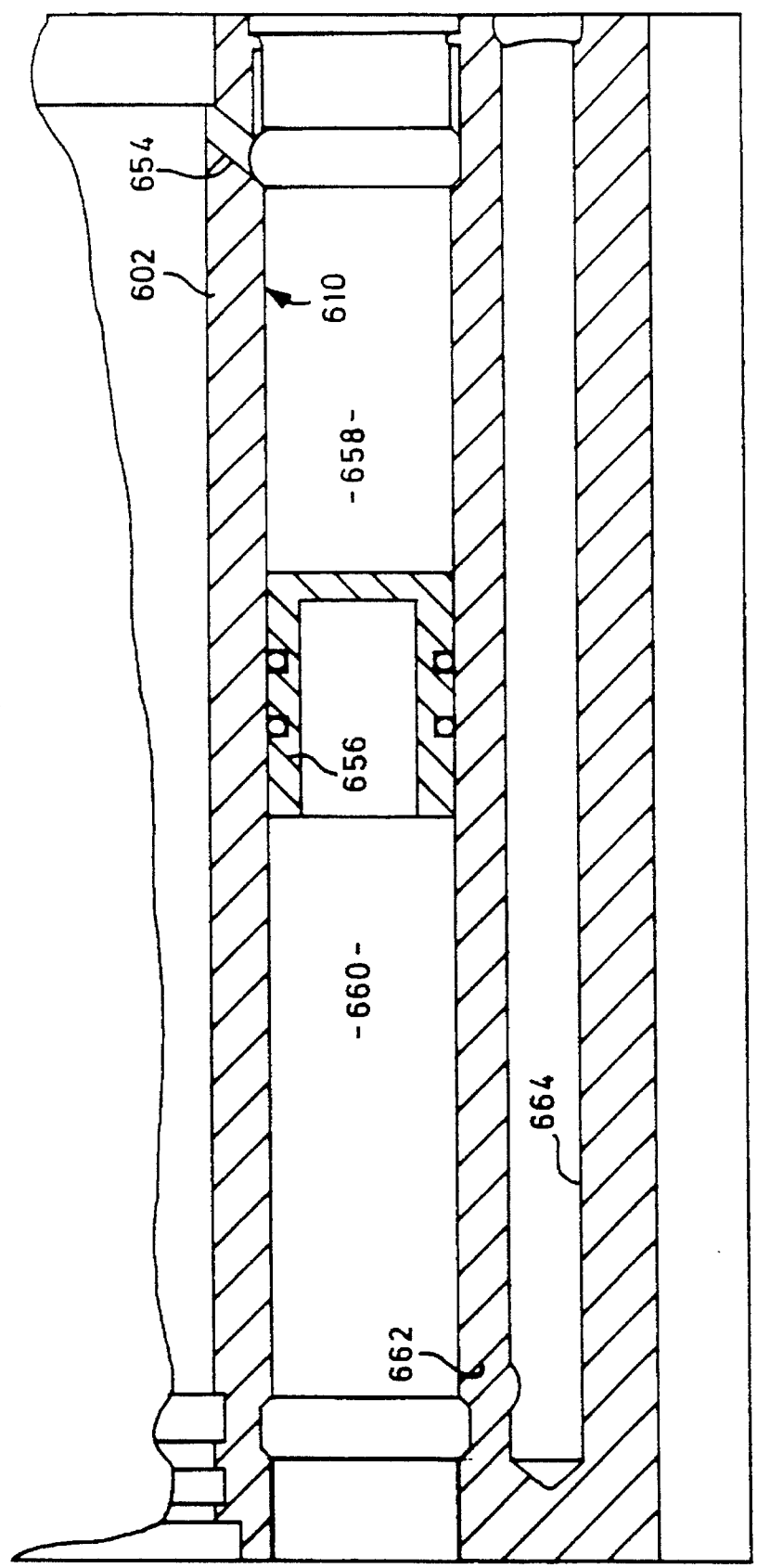

FIG. 12 is a view on the line 12—12 of FIG. 10 showing details of the actuator body.

Figure 13:
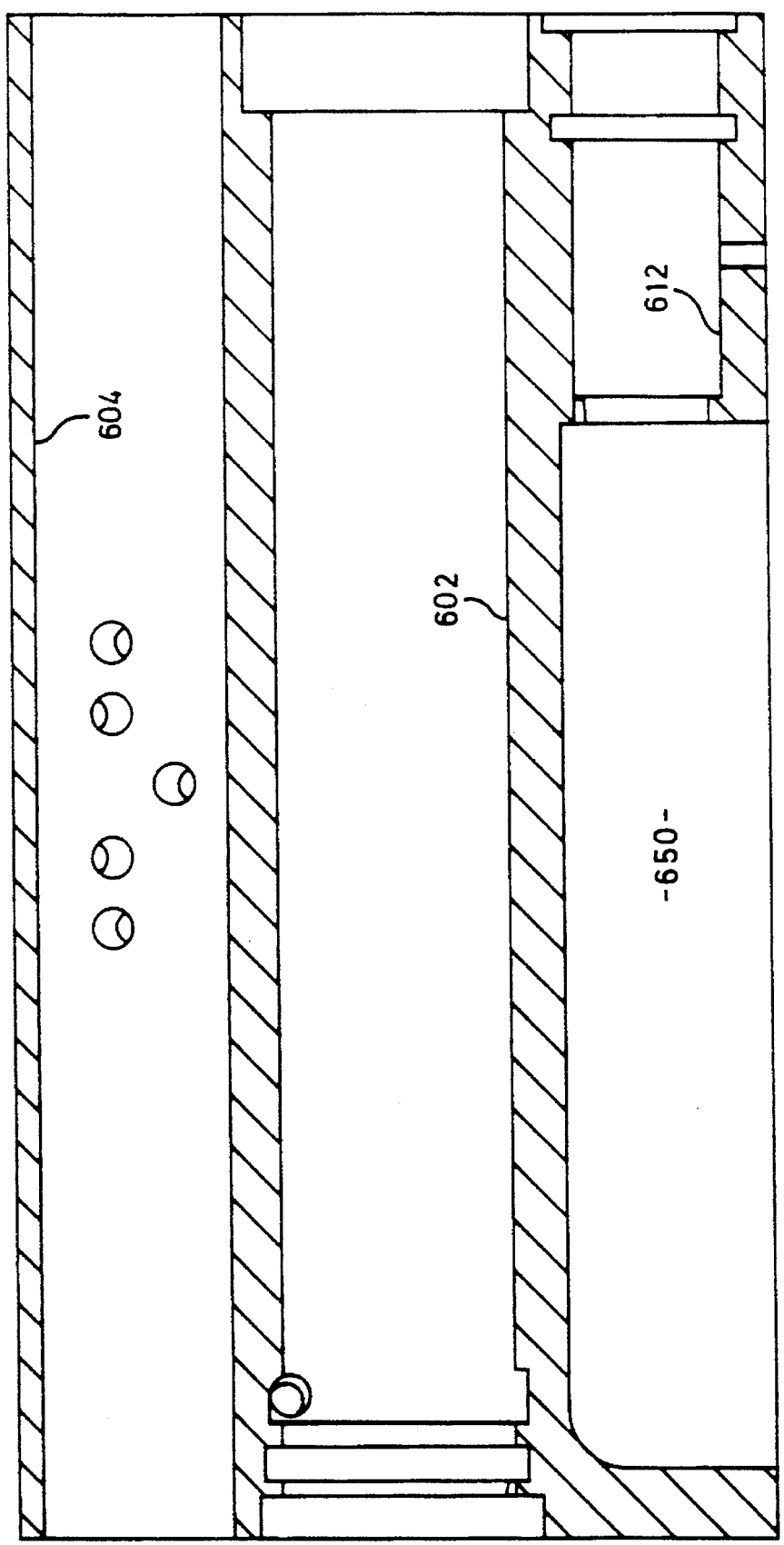

FIG. 13 is a view on the line 13—13 of FIG. 10 showing details of the actuator body.

Figure 14:
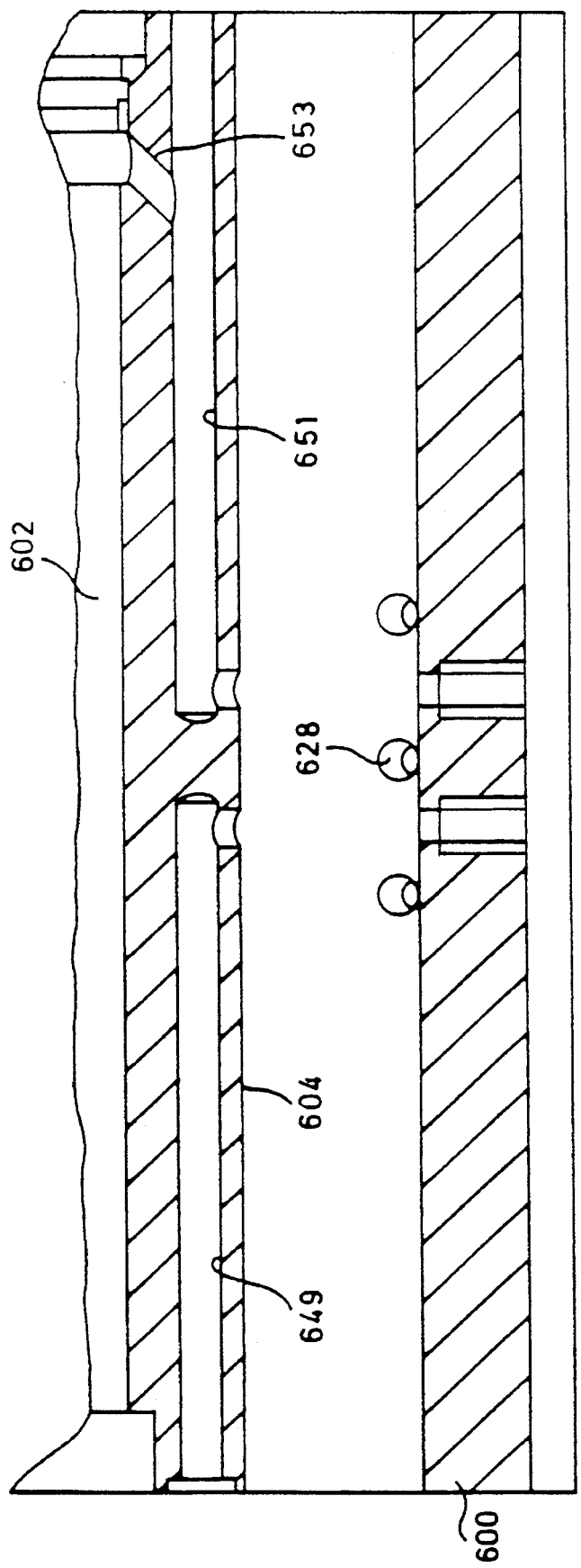

FIG. 14 is a view on the line 14—14 of FIG. 10 showing details of the actuator body.

Figure 15:
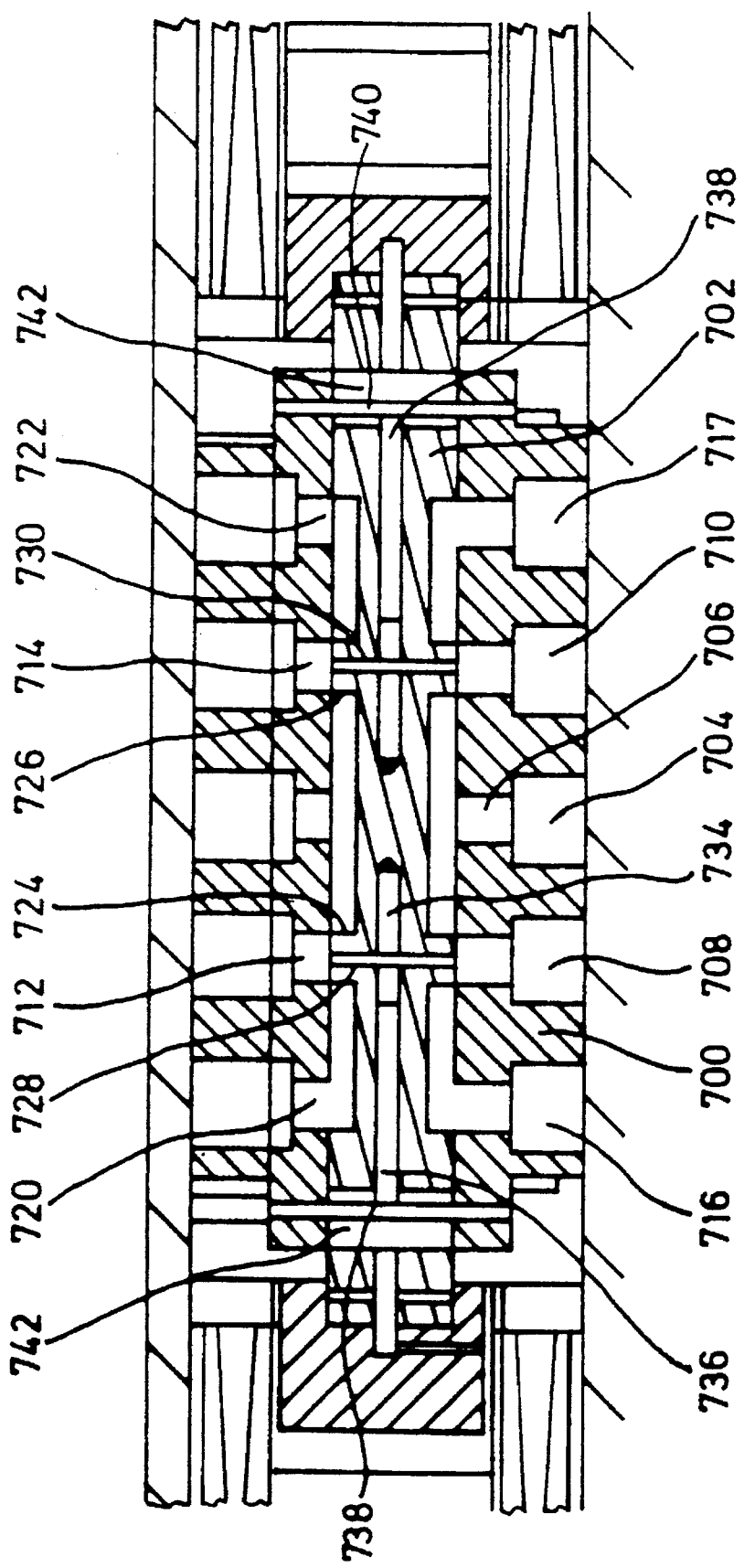

FIG. 15 is an enlarged sectional view of a valve assembly shown in FIG. 9.

Referring therefore to FIG. 1, a suspension system for a vehicle 10 includes a suspension arm 12 pivotally supported at 14 on the vehicle body 16 and having a wheel 18 rotatably mounted at one end. A hydraulic actuator 20 acts between the body 16 and the suspension arm 12 to control movement of the arm relative to the body about pivot 14.

The actuator 20 includes a hydraulic motor generally indicated at 22 and a suspension spring 24. The purpose of spring 24 is to counterbalance at least some of the weight of the vehicle while allowing adjustment of the wheel to be accomplished by the motor 22.

Fluid to the motor 22 is supplied from an engine-driven pump 26 supplied from a reservoir 28 which also receives return fluid from drain conduit 30. Pump 26 is connected through a supply conduit 32 to a valve block 34 secured to the body of the hydraulic motor 22.

Control for the hydraulic motor 22 is also provided through a central suspension management system 36 that receives electrical signals from and provides control signals to a control module 38. The system 36 co-ordinates control for each of the wheels 18 of the vehicle with individual control provided by the control module 38.

Figure 2:
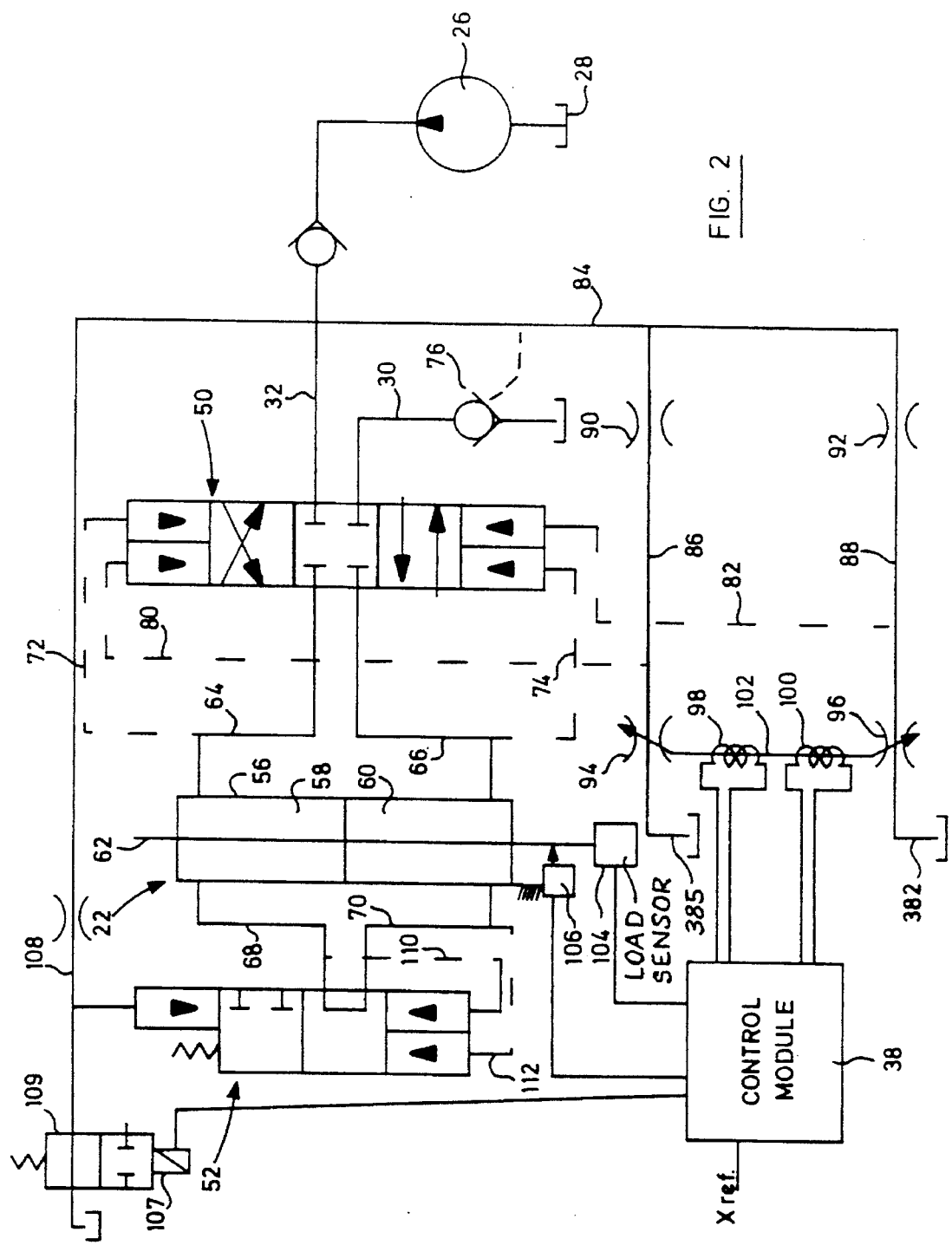
FIG. 2 is a schematic representation of the control system of the vehicle suspension system shown in FIG. 1.

The operation of the actuator 20 is best seen from the schematic circuit diagram shown in FIG. 2. Valve block 34 includes a main control valve 50 and a bypass valve 52. The hydraulic motor 22 includes a cylinder assembly 56 which is divided into a pair of chambers 58,60 by a piston and rod assembly 62. A conduit 64 connects the chamber 58 with one port of the control valve 50 and similarly conduit 66 connects the chamber 60 with another port of the control valve 50. Chambers 58 and 60 are also connected to respective ports of control valve 52 through conduit 68,70.

As shown in FIG. 2, the main control valve 50 is nominally a three-position spool valve having a neutral position in which flow between the control valve 50 and either of chambers 58 or 60 is inhibited. Movement from the neutral position shown is controlled by pilot lines 72,74 connected respectively to the conduit 64,66. A pressure differential between the conduits 64 and 66 will cause the valve 50 to move to connect the pump with one of the chambers 58,60. Thus, if the pressure in chamber 58 is higher than the pressure in chamber 60, pilot line 72 will force the spool 50 to a position in which the pump 26 is connected to the conduit 66 and so to chamber 60. At the same time, the chamber 58 is connected through the valve 50 to the conduit 30. Conduit 30 includes a pilot-operated check valve 76 that is held open by fluid pressure delivered by pump 26. With the pressure in chambers 58 and 60 balanced, the spool is maintained in the neutral position as shown in FIG. 2.

Valve 50 is also controlled through a pair of pilot lines 80,82 acting on opposite ends of the spool of valve 50. The pilot pressure for lines 80 and 82 is derived from pressure conduit 84 connected to line 32 which branches into fixed orifices 90,92. Flow through the control drain lines 86,88 is controlled by fixed orifices 90,92 respectively and by variable orifices 94,96. Flow through the orifices 94,96 is controlled by a pair of coils 98,100 operating on a common operating member 102 so that as the area of orifice 94 is increased and the pressure in line 80 decreased, the area of orifice 96 is reduced which increases the pressure in line 82 and vice-versa.

The coils 98,100 are controlled by signals from the control module 38. Thus, if the module 38 determines that adjustment of the piston assembly 62 within the cylinder assembly 56 is required, the orifices 94,96 are adjusted through operating member 100 so that the pressure in one of the pilot lines 80,82 is increased as the other is decreased. A pressure differential then exists across the spool 50 causing it to move in one direction or the other and allowing flow to either the chamber 58 or 60.

The module 38 receives signals from a load-measuring device 104 and a position-sensing device 106 to determine whether or not adjustment of the piston 62 within the cylinder 58 is required.

As shown in FIG. 6, control module 38 includes an electrical power supply 450, typically the vehicle battery, which is regulated by voltage regulator 452 to supply a controlled reference voltage to position sensor 106 and load sensor 104. The output of position sensor 106 is inverted and amplified by op amp 454 with a variable resistor 456 providing a zero adjustment and resistor 458 providing a scaling factor.

One output of op amp 454 is provided to the central suspension management system 36 as a position feedback and another is fed through a gain setting resistor 460 to a current amplification section 462.

Load sensor 104 is connected in one limb of a bridge circuit 464 which provides inputs to a differential op amp 466. Zero adjustment is provided by variable resistor 468 and scaling of the output is provided by variable resistor 470. The output of differential amplifier 466 is followed by op amp 472 and provides an output indicative of load to the suspension management system 36. An output is also supplied through a gain setting resistor 474 to the current amplification section 462 so that one terminal of an op amp 476 receives the sum of the signals from the load sensor 104 and position sensor 106.

The other input to op amp 476 is the position reference signal $X_{ref}$ provided by the central suspension management unit 36 through voltage protection diodes 478 and a voltage following op amp 480. A pair of resistors 479 are connected in parallel with the diodes 478 to provide a stable, mid-range reference voltage if the signal $X_{ref}$ fails. This will allow for the continued operation of the suspension unit but without the benefit of the control of the management system 36.

The output of op amp 476 is supplied to one side of the coils 98,100 through current sensing resistor 482 and also to an inverting amplifier 484. The output of amplifier 484 is supplied to the opposite side of coils 98,100 through oppositely directed diodes 486,488.

Position sensor 106 provides a signal to the amplifier 476 indicative of the position of the piston rod assembly 62 within the cylinder assembly 56. This is compared with a reference signal $X_{ref}$ supplied from the central management system 36 and if it is greater than the reference signal, the output of op amp 476 is driven high and the output of op amp 484 is driven low so that current flows in coil 100. This varies the pressure in the pilot lines 86,88 so that valve 50 is moved to return the rod assembly 62 to the datum position. If the signal to the amplifier 476 is lower than the reference signal, the output of amplifier 476 is low and that of amplifier 484 high so that current flows in coil 98 to adjust valve 50.

Similarly, load sensor 104 provides a signal level indicative of the load imposed along the axis of actuator 22 and operates through module 38 so that as the loads imposed on the actuator 22 vary, the pressure in pilot lines 86,88 may be adjusted to move valve 50 in a direction to maintain the load at a predetermined level.

Referring once more to FIG. 2, the bypass valve 52 is a two-position valve and is operable in one position to allow the chambers 58 and 60 to communicate with one another and in another position to prevent flow between the chambers 58,60. The valve 52 is moved to the position in which flow between the chambers 58,60 is prevented through a pressure line 108 connected to the pumpline 32 and acting at one end of the spool of valve 52. Pressure in line 108 is regulated by a normally open valve 109 that connects line 108 to tank 28. The valve 109 is closed by a solenoid 107 connected to the electrical power supply (see FIG. 6) as long as the power supply functions correctly.

Movement of the valve 52 to allow flow between the cylinders is derived through pilot lines 110,112 connected to the conduits 68,70 respectively. With pump 26 operating, the pressure applied through the line 108 will hold the valve 52 in a position in which flow is inhibited. However, upon failure of the pump 26 or a breakage in the pressure supply line, pressure generated in either chambers 58 or 60 due to the load supported by the actuator will move valve 52 to a position in which flow between the chambers 58 and 60 can occur, thereby allowing movement of the piston assembly 62 within the cylinder 56.

Similarly, in the event of an electrical failure, valve 109 will vent line 108 to tank and allow valve 52 to move to a position in which the chambers 58,60 are connected.

Under normal operating conditions, assuming for example that the vehicle is stationary with a static load, the pressure in the chambers 58 and 60 will be equal with the weight of the vehicle being taken by spring 24. An increase in the load carried by wheel 18 due, for example, to an increase in the mass of the vehicle, will cause an increase in the pressure in the chamber 58 as well as an increase in the signal from load transducer 104. The increase in the pressure in chamber 58 and the load signal will move the valve 50 to decrease the volume of chamber 58 causing further compression of spring 24. As the spring force increases, the pressure imbalance in chambers 58,60 will decrease, thereby reducing the control signal applied to valve 50 through pilot line 72.

Movement of the piston assembly 62 will cause a signal to be generated by position sensor 106 indicating a departure from a datum position and requiring the chamber 58 to expand to return to the datum position. This signal is in the opposite sense to the load signal and therefore reduces the signal applied to the respective one of coils 98,100. The signals are arranged to be balanced, i.e. zero when the load is fully supported by the spring 22, so that the valve 50 returns to a neutral position.

An increase in the load carried by the wheel 18 due to an undulation in the road attempting to move the wheel 18 upward relative to the vehicle body 16 will cause an increase in pressure in the chamber 58. The pressure differential between chambers 58 and 60 will be sensed through pilot lines 72 and 74 causing the spool 50 to move to a position in which fluid from the pump 26 is directed to the chamber 60 and the chamber 58 is connected to the reservoir 28. This will cause the piston assembly 62 to move upwardly to decrease the volume of chamber 58 and reduce the pressure differential. At that time, the control valve 50 returns to a neutral condition.

Load sensor 104 will also detect an increase in the wheel loading and will generate a signal through control module 38 to increase the pressure in pilot line 80 and move the valve 52 to maintain the connection of chamber 58 to the reservoir 28.

As the piston assembly 62 moves upwardly, the position sensor 106 produces a signal tending to reduce the pressure in pilot line 80 and so allow the valve-52 to return to neutral when the pressure differential has been minimized.

In a similar manner, a subsequent undulation requiring the wheel to move downward relative to the vehicle body 16 will reduce the load signal so that the position signal from sensor 104 will act through coils 98,100 to increase the pilot pressures in pilot line 82 and correct pump 26 to the chamber 58. This allows the wheel 16 to follow undulations while supporting the vehicle.

In the system described above, the control module 38 is described as receiving signals from the load sensor 104 and position sensor 106 to modulate the current supplied to the coils 98,100. It will be apparent that control signals from other sensors, for example lateral and longitudinal accelerometers may also be supplied to the module from the suspension management system 36 and may be used to modulate the current to the coils 98,100 and therefore adjust the control valve 50. In this manner the actuator 22 may be controlled to provide an appropriate response to different operating parameters.

As noted above, failure of either the pump or electrical power to the actuator electronics will cause valve 52 to connect the chambers 58,60. This allows wheel 16 to move relative to the vehicle body to accomodate undulations with the motor 22 acting as a damper.

It will be appreciated that the control valve 50 although schematically shown as a three-position control valve would in fact attain a position in which the spool is balanced by the opposing hydraulic pilot signals so that appropriate controlled movement of the valve 50 is obtained. This will be appreciated more fully from the detailed description of the actuator 20 that may be seen with reference to FIGS. 3, 4 and 5.

Referring therefore to FIG. 3, the piston and rod assembly 62 of the motor 22 includes a piston 120 integrally formed with a piston rod 122. Piston rod 122 extends to opposite sides of the piston 120 and is supported at spaced locations by bearings 124,126 defining the end walls of the cylinder assembly 56. The rod 122 is formed with a central bore 128 which is plugged at one end by a spigot 130. The spigot 130 is connected to the end wall 132 of an outer sleeve 134 that partially overlaps the outer cylindrical housing 136 of the cylinder assembly 56. Sleeve 134 carries a wiper 138 at one end to prevent dust and dirt accumulating between the outer wall 136 and the sleeve 134.

The cylindrical housing 136 is secured to a cylinder head 140 that accomodates the valves 50,52 as more fully described below. The cylinder head 140 also carries a spring support cup 140 that is screwed onto a boss 144 of the head 142 and has an arm 146 projecting inwardly to engage a shoulder 148 of the housing 136 and secure it to the cylinder head 140. Cup 142 supports one end of spring 24 with the other end being supported on an annular race 150. Race 150 is supported on bearings 152 for rotation relative to an end cap 154 secured to the spigot 130. The bearing 152 allows relative rotation between the race 150 and cap 154 as the length of the spring 24 is varied and so inhibits torsional loads being transmitted into the motor 22.

Piston 120 is in sliding engagement with an inner cylindrical sleeve 156 which is supported at opposite ends on the bearings 124,126. Sleeve 156 is radially spaced from an outer sleeve 158 that is supported within the housing 136 and extends from the bearing 126 to the cylinder head 140. Cross ports 160 are provided in the inner sleeve 156 adjacent the bearing 126 to allow flow into the cylinder 58 defined between the piston 120, cylinder rod 122, bearing 126 and sleeve 156. The annular passage 162 formed between the sleeves 156,158 forms part of the conduit 64 extending from the valve 50 located in the cylinder head 140 illustrated schematically in FIG. 2. Conduit 64 is further constituted by a radial drilling 168 and a cross drilling 170 in the sleeve 158. The conduit 66 which allows flow from the valve 50 into the chamber 60 defined between the piston 120, piston rod 122, sleeve 156 and bearing 124 is formed by a cross drilling 174 in the sleeve 156 and a radial drilling 176 in the cylinder head.

Similar drillings 178,180 are provided adjacent the valve 52 and are aligned with cross drillings 182,184 respectively to constitute the conduits 68 and 70 that connect valve 52 with the chambers 58,60 respectively.

As can best be seen in FIG. 4, the valves 50,52 are located in transverse bores 200,202 respectively provided in the cylinder head 140. Valve 50 includes an outer sleeve 204 that is located within the bore 200 by end caps 206,208. A spool 210 is slidable within the sleeve 204 within the limits set by the end caps 206,208. Conduit 32 from pump 26 is connected to a port 212 which is aligned with an annular recess 214 formed in the sleeve 204. A pair of diametrically opposed drillings 216 connect with the recesses 214 to supply fluid from the conduit 32 into the interior of the sleeve 204. Drain lines 30 are similarly connected to ports 220,222 each of which is in register with an annular recess 224,226 and cross drillings 228,230. The lands provided by the sleeve 204 to either side of the recesses inhibits flow between the port 212 and the ports 220,222.

Sleeve 204 includes a further pair of annular recesses 232,234 which are aligned with the drillings 168,176 respectively. The recesses 232,234 are located between the recesses 214 and 224,226 respectively and are aligned with cross drillings 236,238 which communicate with the interior of the sleeve 204. The lands formed to either side of the recesses 232,234 inhibit flow between the spool 204 and the bore 200.

The spool 210 includes a first pair of lands 250,252 which are axially spaced so as to be aligned with the drillings 236,238. The width of the lands 250,252 corresponds to the diameter of the cross drillings 236,238 and the annular recess 254 formed between the lands 250,252 is aligned with the cross drilling 216 communicating with port 212. An outer pair of lands 256,258 are located outwardly of the cross drillings 228,230 to either side of the lands 250,252. The annular recess 260,262 formed between the lands 258,252 and 250,256 overlap the cross drillings 228, 230.

Each end of spool 210 is formed as a cylindrical shoulder 268 and received within a fixed sleeve 270 located between the end caps 206,208 and the respective end face of sleeve 204. The sleeve 270 and shoulder 268 define a pair of annular chambers 272,274 at each end of the spool 210.

An internal passageway 276 is formed within the spool 210 and extends from each of the chambers 272 to the respective one of cross drillings 236,238. Thus pressures that exist in the drilling 168 or 176 are transmitted to a respective one of the chambers 272 through the internal passageway 276. The chamber 274 is connected through a port in respective ones of the end caps 206,208 with pilot lines 80,82 respectively. It will be seen therefore that movement of the spool 210 within the sleeve 204 is subjected to forces derived in one direction from the pressure in the chamber 58 and in the line 86 and in the other direction by pressure in the chamber 60 and the line 88.

The valve 52 includes a sleeve 300 having cross drillings 302,304 aligned with the ports 178,180 respectively in the cylinder head 140. A spool 306 is movable within the sleeve 300 and includes a pair of lands 308,310 with an elongate annular recess 312 between them. One end of the spool 306 is formed as a cylindrical shoulder 314 of reduced cross section that is received within a sleeve 316 secured by an end cap 318 to the cylinder head 140. A pair of annular chambers 320,322 are thus formed at one end of the spool 306 between the sleeve 300 and the end cap 318.

An internal drilling 324 extends from the cross drilling 302 to the chamber 322 to constitute the pilot line 110. Pilot line 112 is provided by an internal drilling 326 within the cylinder head 140 and a cross drilling 328 in the sleeve 300 which communicates with an extension of the drilling 180.

The spool 306 is biased towards the end cap 318 by a spring 330 acting between the spool 306 and an opposite end cap 340. The spool 310 is also subjected to pressure supplied through line 108 formed internally within the cylinder head 140 and supplied through a cross drilling 342 to the end of the spool 306.

The spool 306 is thus influenced in one direction by the force of the spring and the pressure forces produced by the line 108 on the spool and is subjected to an opposite force generated by fluid pressure in the chambers 320,322 from the chambers 58,60 respectively. Under normal operating circumstances, the forces generated by the pressure fluid through line 108 are sufficient to prevent movement of the spool 306 away from the end cap so that the land 308 blocks flow between the ports 302,304. However, in the event of a failure of pump 26, the pressure forces generated in the chambers 320,322 will move the spool 310 towards the end cap 340 and cause the recess 312 to bridge the ports 302,304. In this position, the chambers 58 and 60 are interconnected allowing the transfer of fluid between the chambers.

Referring briefly to FIG. 3, a flow control unit 350 incorporating the orifices 94,96 and operating member 100 is mounted on the motor 22 adjacent the cylinder head 140. Control unit 350 is shown in further detail in FIG. 5 from which it can be seen that control unit 350 includes a cylindrical housing 352 having a pair of end caps 354,356. The housing 352 is provided with an inwardly directed flange 355 that supports a tubular partition 357. Partition 357 supports a pair of bearings 358,360 formed of a magnetically active material which are an interference fit within the partition 356. The bearings 358,360 each have an axial bore 362,364 in which a non-magnetizable pin 366 slides. Pin 366 carries a magnetizable core 368 located between the bearing members 358,360 with a balance passageway 370 extending between the end faces of the core. A clearance fit is provided between the outer surface of the core 368 and the inner surface of the tubular partition 357 and the spacing of the end faces of the core 368 is such as to provide limited axial movement between the bearings 358,360.

End faces of the pin 366 are flush with the end faces of the bearing 358 and the cylindrical housing 352. Each of the end caps 354,356 is formed with an annular recess 372 with a central nozzle 374 aligned with the pin 366. The end face of the nozzle 374 is recessed slightly relative to the end faces of the end caps 354 typically in the order of 0.002 inches so that a maximum of 0.004 inches of movement is provided between the pin 366 and the end faces of the nozzles 374.

Fluid is supplied from the pilot line 86 through an internal bore 376 to the nozzle 374 associated with end cap 356. The pilot line 88 is connected to an internal duct 378 which supplies fluid to the nozzle 374 associated with the end cap 354. Drain ports 380,382 are provided in the end caps 354,356 respectively.

The co-operation between the nozzles 374 and the pin 366 constitute the variable orifices 94,96 used to control the pressure in the pilot lines 80,82 respectively. The control of the operating member 102 constituted by the core 368 and pin 366 is provided by the coils 98,100 which are located between the housing 352 and the partition 357 on either side of the radial flange 355. Current supplied to one or other of the coils will cause the pin 366 to move toward one of the nozzles 374 and therefore restrict the flow of fluid from the duct 376 or 378. This will increase the pressure in the associated one of the conduits 86,88 as described above with respect to FIG. 2.

Referring once more to FIG. 3, the position sensor 106 illustrated in FIG. 2 is incorporated in the actuator 22. A cylindrical housing 400 projects outwardly from the bearing 124 around the piston rod 122. The housing 400 is connected to a trunnion block 402 carrying a ball joint 404 which is secured to the suspension arm 12. The trunnion block 402 also carries an elongate tube 404 which extends within the cylinder 128 of piston rod 122. A seal assembly 406 is carried by the piston rod 122 and sealingly engages the tubular member 404 allowing it to slide through the seal assembly 406. The tube 404 communicates with an internal passageway 408 formed in the trunnion block 402 which conveys fluid to a cylinder 410. Cylinder 410 is located within a bore 412 carried by the housing 400 and comprises a stepped sleeve 414 and a pair of annular sleeves 416,418. A sealing ring 420 is located between the sleeves 416,418 to seal against a piston member 422. A pin 424 projects from the sleeve 416 into a slot 426 formed in the piston member 422 to inhibit rotation of the piston member within the cylinder. A non-magnetic plug 428 is carried within the piston member 422 with a spring 430 holding the plug 428 against the piston and biassing it toward the trunnion block 402. The plug 430 includes a tail 432 which carries a magnetic slug 434. A Hall effect transducer 436 is located in the stepped sleeve 414 adjacent the magnetic slug 434 so that movement of the piston member 422 will produce a signal through the Hall effect transducer indicative of the movement.

A charging port 438 communicating with the passage 408 permits the internal cylinder 128, passageway 408 and cylinder 410 to be filled with suitable stable fluids such as a silicon-based oil. Upon sealing the port 438, a constant volume chamber is provided by the cylinder 410, passageway 408 and cylinder 128. However, as the piston rod 122 moves within the cylinder 56, fluid will be displaced from the cylinder 128 through the tube 404 and into the chamber 410. The piston 422 will be moved against the bias of the spring 430 to move the magnetic slug 434 and produce a signal from the Hall effect transducer 436. The signal provided by the transducer 436 is thus indicative of the position of the piston 120 within the cylinder 56 and therefore is indicative of the overall length of the actuator 22. Signal from the transducer 436 is fed to the control module 38 for comparison with the reference signal as described above with respect to FIG. 2.

The load transducer 104 is conveniently located within the actuator structure 22 as shown on the interior trinnior block 402 and may comprise any suitable form of transducer, such as a strain gauge type load cell, which can be calibrated against loads applied along the axis of the actuator.

The overall operation of the system has been described above with respect to FIG. 2 and therefore will not be described in further detail with respect to FIGS. 4 and 5. However, it will be noted with respect to FIG. 4 that the movement of the valve 50 is controlled by the sum of the pressure forces acting through the opposed balanced areas provided by chambers 272 and 274. Thus, a pressure differential within the cylinder 22 may be countered by an error signal from the transducer 106 acting through the pilot line 80. In practice, the spool 210 will adopt a position which modulates the response to these signals.

If preferred, a position sensor may be provided on spool 210 so that a feedback loop may be supplied to the control module 38. The position feedback of the valve may be utilized to modulate the current to the coils 98,100 so that, for example, the spool 210 may be maintained in a neutral position under certain conditions or an offset for the valve may be introduced to adjust for varying vehicle load conditions.

Disturbances resulting from movement across a road surface tend to be high frequency and high energy content and therefore the differential pressure in the chambers 58,60 is effective to operate valve 50. Lower frequency, lower energy content disturbances are accomodated by operation of the valve 50 under the control of the sensors 104,106.

The operation of the bypass valve 52 enables the actuator 22 to operate in a manner similar to a conventional damper upon failure of the pressurized supply and the provision of the check valve in supply line 32 and the pilot-operated check valve 26 in drain line 30 ensures that safe operation can be maintained without loss of working fluid. It will be noted with the embodiment of valve 52 shown in FIG. 4 that the pressure generated within the chambers 58,60 will act to move the valve to an open position. By appropriate calibration of spring 330 are chambers 320,322, it is possible to modulate the position of the spool 306 to provide progressive metering of the flow between the chambers 58,60. Thus, large induced loads generating relatively high pressures in chambers 58 or 60 will tend to move spool 306 to a fully open position allowing rapid movement of the piston assembly 62. For smaller induced loads, a smaller opening will be generated, thereby providing further control of the wheel 16.

In the embodiment, spring 24 is shown as a coil spring but, if preferred, an air spring could be used to reduce weight. This would permit initial adjustment of the ride height by varying the pressure in the air spring which thereafter would operate in a normal manner.

It will be noted that the arrangement shown in FIG. 4 provides a compact yet robust configuration of actuator and valves with minimal external connections. In this regard, it should also be noted that the provision of the inner and outer walls 156,158 ensures that the maximum pressure to which the chamber 58 or 60 is subjected is the differential pressure between the chambers. This inhibits expansion of the cylinder and therefore provides more reliable operation.

The flow control unit 350 also provides a compact versatile electrohydraulic control system. The use of a common operating member 366 ensures conjoint adjustment of the fluid pressure to the chambers 274 to control movement of valve 50. Moreover, the operating member is inherently stable with a return to a neutral or null point with no electrical power supplied. By providing a pair of coils, the unit is bidirectional and symmetrical in function and provides a differential pressure in the control lines that is proportional to coil current allowing control by current adjustment. The voltage to current interface provided by the current application section 462 thus allows voltage changes to be reflected as pressure changes in a simple and proportional manner allowing control of high energy loads in a simple and efficient manner. This allows a variety of different inputs to be utilized with the unit.

A modification of the actuator shown in FIGS. 3 and 4 is illustrated in FIG. 7 in which like reference numerals will be utilized to denote like components with a suffix a added for clarity of description. The operation of the actuator shown in FIG. 7 is in most respects similar to that described with respect to FIGS. 3 and 4 and therefore detailed explanation of those components will not be provided.

In the embodiment shown in FIG. 7, the flow to the chambers 58a, 60a of motor 22a is controlled by a valve 50a operating in a manner described above. Fluid is supplied to valve 50a through passageway 212a from an external conduit 32a. Flow control unit 350a provides control pilot pressures to the valve 50a and the pressure fluid in the respective chambers 58a, 60a is also transmitted through internal passageways to opposite ends of the spool in valve 50a as described above.

In the embodiment of FIG. 7, flow between the chambers 58a, 60a and the pump or sump passes through one of a pair of pilot operated flow control valves 500. Each of the chambers 58a, 60a has a flow control valve 500 associated with it, although because of the identical nature of the valves only one is shown in FIG. 7. It will be understood that the other valve is located in parallel to the one shown in FIG. 7.

Each of the flow control valves 500 includes a pilot pressure chamber 502 that is connected to the outlets 64a, 66a from the valve 50a respectively. Thus the conduit 64a, 66a are not connected directly to the chambers 58a, 60a as in the previous embodiment, but are in fact connected to the pilot chamber 502.

Valve 500 includes a stationary sleeve 504 that is located in a bore 506 in the head portion 140a of the actuator 22a. The bore 506 is connected to a respective one of the chambers 58a, 60a through internal ducts 168a and 176a respectively.

The sleeve 504 includes a pressure inlet annulus 508 connected to the interior of the sleeve 504 by a cross drilling 510, a cross flow annulus 512 connected to the interior of the sleeve 504 by a cross drilling 514 and a tank annulus 516 connected to the interior of the sleeve by a cross drilling 518.

A slidable spool 520 is located in the interior of the sleeve 504 and includes on its outer surface lands 522, 524 and 526 that cooperate with the ports 510, 514 and 518 respectively. A pair of cross ports 528 and 530 connect the annuluses located between the lands 522 and 524 and 524 and 526 respectively with a longitudinal cavity 532 provided in the interior of spool 520. Cavity 532 is hydraulically connected to the interior of the bore 506 and therefore is hydraulically connected to respective one of the chambers 58a, 60a.

The cross flow annuluses 512 on each of the valves 504 are interconnected by a cross drilling 534 and the spool biased by means of a spring 535 acting in the pilot chamber 502 to a position in which the lands 522, 524 and 526 cover the ports 510, 514 and 518 respectively.

The chamber 502 is vented to the tank 28a by means of a vent passage 536 provided in the sleeve 504. The vent passage 536 connects with the tank annulus 516 so that fluid in the pressure chamber 502 constantly flows to the tank 28a. The vent passage 536 is relatively small and provides a restricted flow from the chamber 502.

In operation, provided the valve 50a is in the null or neutral position indicating no pressure differential between the chambers 58,60 and no departure from the predetermined parameters being sent by the control module 38a the spool 530 will be located with the cross drillings 510, 514 and 518 covered by their respective lands. In this position fluid is locked within the chambers 58a, 60a and movement of the piston rod assembly 62a is inhibited. If the pressure in one of the chambers 58a, 60a increases, the differential pressure will be sensed by the valve 50a, which moves in a direction to allow flow out of the chamber having the highest pressure. The pilot pressure chamber 502 associated with the chamber having the highest pressure is vented to tank through valve 50a and the pilot pressure chamber 502 in the other of valves 500 is connected to pump 36a. The vented pilot pressure chamber 502 thus allows the spool 530 to move to a position in which the lands 526 uncovers the cross drilling 518 and fluid can flow through the cross drilling 518 through the port 530 and into the tank annulus 516. Thus fluid can flow out of the chamber 58a, 60a having the highest pressure to tank. At the same time, the movement of the spool 520 causes the land 524 to uncover the cross drilling 514 so that the interior of the high pressure chamber 58a, 60a is also connected with the cross drilling 534. The land 522 prevents flow from annulus 508 into the chamber.

The other of valves 500, whose pilot pressure chamber 502 is connected to the pump 36a, is moved in a direction so that the land 522 uncovers the drilling 510. In this position, fluid from the pump is supplied to the longitudinal cavity 532 and into the chamber having the lowest pressure. At the same time, the lands 524 and 526 prevent flow through the drillings 514,518 respectively so that the flow to tank and flow through the cross drilling 534 is prevented. The piston 120a thus moves in a direction to equalize the pressure differential at which time the valve 50a is returned to neutral as described above.

In the event of a loss of power or at very high frequencies, the control valve 58a is not able to supply pressurized fluid to the pilot pressure chamber 502 in the valves 500. In this situation the high pressure in the chambers 58a, 60a will drive the valve 50a between positions in which each of the pilot chambers 502 is vented so that after a few cycles at very high frequency the pressure in the pilot chambers 502 is essentially tank pressure. In this situation, the spool 530 in each of the valves 500 is moved into a position in which the land 524 uncovers the port 514 so that flow through the cross drillings 534 is permitted. In this condition fluid is simply displaced between the chambers 58a, 60a which however provides effective control of the suspension arm at the very high frequencies. Any control signal indicating a low frequency departure from the set parameters will bias the valve 50a to a position to return the piston rod assembly 62a to the desired location. This however will be superimposed upon the high frequency signals. The valves 500 therefore not only accomodate high frequency damping but also serves the function of the shuttle valve 52 in the event of system failure.

The arrangement of the load sensor 104 is also shown in further detail in FIG. 7. A strain gauge assembly 540 is mounted on a thin steel diaphragm 542 which spans a depression 544 in the inner face 544 of trunnion block 402. The diaphragm 542 is secured to the face 544 by bolts 546. Loads imposed along the axis of the actuator 20 will load the trunnion block 402 and thus introduce a strain into diaphragm 542.

A further embodiment of the actuator is shown in FIGS. 8 through 14 and again like reference numerals will be used to denote like components with a suffix "b" added for clarity. In the embodiment of FIGS. 8 through 13, the mechanical spring 24 is replaced with a gas spring 24b located within the body of the actuator 20b. The operation of the actuator 20b is best seen from FIG. 8 which shows schematically the interrelationship of the components incorporated into the actuator 22b.

In the embodiment shown schematically in FIG. 8, the motor 22b of actuator 20b includes a central stationary rod 550 concentric with the outer cylindrical housing 136b. Piston and rod assembly 62b comprising the piston rod 122b and piston 120b is slidable within the housing 136b on the stationary rod 550. Chamber 58b is formed between the rod 122b and the stationary member 550 and the chamber 60b is formed between the piston rod 122b, piston 120b and housing 136b. A third chamber 552 is thus formed within the cylindrical housing 136b between piston 120b and stationary rod 550. Flow to and from the chambers 58b, 60b is controlled by the valve 50b supplied with fluid through conduit 32b from pump 26b. The valve 50b is connected to the chamber 60b by conduit 66b and to chamber 58b by conduit 64b.

The pump 26b is also connected to a conduit 554 through a valve 562 to the chamber 552. A gas accumulator 556 is located in line 554 so that fluid in the line 554 is maintained under the pressure determined by gas in the accumulator 556. An accumulator 558 is also provided in the conduit 32b to provide a supply of pressurized fluid to the valve 50b in addition to that provided by pump 36b.

The displacement measuring device 106b is provided on the actuator with the rod 404b carried by the piston rod 122b and slidable within a central bore 560 in the stationary rod 550. The bore 560 communicates with chamber 410b in the displacement measuring device so that relative movement of the rod 404b within the bore 560 causes a corresponding displacement of the piston 412b and sensing by the displacement transducer 436b.

The operation of the actuator 20b shown in FIG. 8 under fluctuating loads is similar to that described above and therefore will not be described in further detail. However it should be noted that the chamber 552 is filled with oil pressurized by the accumulator 556. The chamber 552 thus provides a resilient force opposing movement of the piston 120b by virtue of the gas pressure in the accumulator 556. The accumulator 556 thus provides a gas spring in series with the piston 120b and avoids the need for the mechanical spring 24 shown in FIG. 3.

The initial pressurization of the chamber 552 is controlled by valve 562 which can be moved to positions in which the line 554 is connected with either pump 26b or tank 28b. The volume of fluid in the chamber 552b and line 554 may thus be increased to increase the pressure of gas in the accumulator 556. Once the desired pressure has been attained, the valve 562 is returned toga central position in which the volume of fluid within the chamber 552, accumulator 556 and conduit 554 is maintained constant. Valve 562 may conveniently be operated during initialization of the suspension system to accomodate for changes in load carried by the vehicle and return the ride height of the vehicle to the predetermined position as sensed by the position sensor 106b. The increased pressure in gas in the accumulators 556 will not affect the spring rate of the gas spring 24b significantly but does permit the initial preload in the spring 24b to be adjusted.

The schematic arrangement shown in FIG. 8 is implemented in the actuator shown in FIGS. 9 through 15. Again like components to those shown in the embodiments shown in FIGS. 3 and 4 use like reference numerals with a suffix "b" added. The actuator shown in FIGS. 9 through 15 is specifically designed to provide a compact unit and incorporate the valve 50b, accumulators 556 and 558, load sensor 104b and position sensor 106b within the envelope of the actuator 20b. This not only minimizes the number of individual components to be installed in a vehicle, but also reduces the flow paths of fluid and therefore increases the performance of the actuator when used in the active suspension.

Referring, therefore, to FIG. 9, the actuator 20b is contained within a cylindrical body 600 which, as will be explained more fully below, also accomodates the valve 50b, accumulator 558 and accumulator 556. End caps 614,616 are located at opposite ends of the body 600 to allow attachment of trunnion block 402b and support for piston and rod assembly 62b.

As best seen in FIG. 10, which shows the body with components removed the cylindrical body 600 has a central through-bore 602 to receive the motor 22b. A cylindrical through-bore 604 is located parallel to but spaced from the bore 602 to accomodate the valve 50b, and a cylindrical through-bore 606 is provided spaced from the bore 604 to accomodate the accumulator 558. Adjacent to the bore 600 but circumferentially spaced from it is a further cylindrical through-bore 608 which provides a gas store for the accumulator 558. The accumulator 556 is located within a through-bore 610 and the displacement transducer 106b accomodated in a cylindrical cavity 612. The bores in the body 600 are sealed by end caps 614, 616 respectively.

As can best be seen in FIG. 11, the accumulator 558 is provided with a piston 618 located within the bore 606. Piston 618 is slidable within the bore and divides the bore 606 into an oil chamber 620 and a gas chamber 622. Pressurized fluid is supplied to the oil chamber 620 through an inlet port at one end of the bore 606 and is supplied to the valve bore 604 by way of an axial transfer duct 624 and an inclined cross drilling 626. The duct 624 also extends axially and communicates through a cross drilling 628 with the valve bore 604.

The gas chamber 622 is supplied with pressurized gas through an inlet port at the opposite end of bore 606 and communicates with the bore 608 by a gas transfer duct 630 and axial supply port 630 and cross drillings 632,634. The bore 608 thus provides a storage volume for gas. The bore 608 is sealed at opposite ends by plugs 636 and likewise the transfer ducts are sealed at opposite ends by plugs 638. Pressure supplied from pump 36b is therefore directed not only to the valve 50b but also into the oil chamber 620 to pressurize the gas in chamber 622 and store the fluid at the pressure delivered by the pump. In this manner a large volume of fluid at maximum pump pressure is available for utilization by the valve 50b.

Referring once more to FIG. 9, the motor 22b is accomodated within the cylindrical bore 602 with the walls of the bore 602 providing the cylinder walls 136b. Piston 120b is slidable within the bore 602 and is supported by linear bearing assembly 640 for sliding motion relative to the body 600. Stationary piston 550 is formed from an elongated tubular nose 642 extending from the end cap 616 along the bore 602. The piston 120b slides along the radial outer surface of the tubular nose 642 so that the cavity 552 is defined on the opposite side of the piston 120b to the chamber 60b. The tubular nose 642 is located by a central elongated spigot 644 which extends within the nose 642 and is maintained in spaced relationship from it by flights 646 to define a passageway 647. Passageway 647 allows fluid to pass from the valve bore 604 through an axial duct 649 and internal passageways in the end cap 616 into the chamber 58b formed at the distal end of the stationary piston 550 (see FIG. 14). Similarly, an axial duct 651 delivers fluid by a cross port 653 into chamber 60b.

The spigot 644 is formed with an axial bore 648 within which slides a rod 404b. Seals 650 are provided to prevent fluid flowing into the chamber 58b and provide an enclosed volume for the position sensor 106b. A vent passage is provided for rod 404 in the rod 122b to allow air to be expelled from the bore 648 during initial filling. The bore 648 communicates through radial passages in end cap 616 with the bore 612 which forms the chamber 410b for the position transducer piston 412b. As seen in FIG. 13, the bore 612 extends into an open cavity 650 which is formed on one side of body 600. The cavity 600 houses the electronic control module 38b and is conveniently positioned to receive the signals from the position transducer 106b and load transducer 104b, which, it will be understood, is located in trunnion block 402b in the manner shown in FIG. 7.

To provide the spring 24b, the chamber 552 communicates with the bore 610 through a cross drilling 654 located at one end of the bore 602. This is best seen in FIG. 12 where it will be seen that the accumulator 556 includes a piston 656 which is slidable within the bore 610. The piston 656 divides the bore 610 into an oil chamber 658 and gas chamber 660. The gas chamber 660 is charged through a cross port 662 communicating with a charging duct 664 formed in the body 600. The chamber 552 and oil chamber 658 form a constant volume chamber so that as the piston 120b moves, the piston 656 follows to define the constant volume. The movement of the piston 656 causes change in pressure in the gas stored in the gas chamber 660 to provide the required resilience for the spring. The mass of gas within the gas chamber 660 and therefore the spring rate may be adjusted by adding or extracting gas through the charging duct 664 by means of an external valve connected to end cap 664 as shown in FIG. 8 at valve 562.

Fluid flow to the chambers 58b, 60b is controlled by the valve 50b located in the bore 604 and shown in more detail in FIG. 15. The valve 50b operates on similar principles as those described above in that a pressure differential across the piston 120b produces a displacement of a spool in the direction that will allow to reduce the pressure differential and that external sensors can modulate current flow to coils that operate on the valve to modulate the flow to the cylinders 58b, 60b. However the construction of the valve is different to that shown in FIG. 4.

As seen in FIGS. 9 and 15; the valve 50b includes an outer sleeve 700 and a spool 702 axially slidable within the sleeve 700. The sleeve 700 is formed with a central annulus 704 connected to the cross drilling 628 from the pressure supply duct 624 in the body 600 and communicating through a cross drilling 706 with the interior of the sleeve 700. Supply annuluses 708,710 are disposed on either side of the annulus 704 and are connected to cross drillings 712,714 respectively to the interior of the spool 702. The annuluses 708,710 are connected through internal ducts 649,653 to the chambers 60b, 58b in the actuator 22b. A further pair of annuluses 716,717 are disposed on either side of the supply annuluses and through cross ports 720,722 connect the interior to sleeve 700 to the tank by way of a drainage duct 666 in the body 600.

The spool 702 is formed with a pair of lands 724,726 respectively that cover the cross drilling 712,714 respectively to inhibit flow from either of the pressure annulus 704 or drain annulus 716,718 to the supply annuluses 708,710. Movement of the spool 702 from the central position will connect the pressure annulus 704 with one of the supply annuluses and likewise the other supply annulus with the drain to allow movement of the piston 120b within the actuator.

A pilot cross port 728,730 is provided in the lands 724,726 and communicates with axial cylinders 732,734. A piston 736,738 is located within each of the cylinders 732,734 and bears against a pin 738,740 carried by the sleeve 700. Each pin 738,740 passes through an elongate slot 742 in the spool 702 so that the spool may move axially relative to the sleeve and the pin. The pistons 736,738 are subjected to the pressure in the chambers 58b, 60b of motor 28b through the cross ports 728 and 730 respectively. Thus any differential pressure in the chamber 58b, 60b causes a force to be exerted from the piston 736 against the pins 738 tending to move the spool away from the central position. Which ever of the supply annuluses 708,710 has the higher pressure, the pressure in the cylinders 732,734 is such as to connect the higher pressure port with the tank and the lower pressure port with the pressure annulus. In this way the valve is controlled to allow movement of the piston 120b in a direction to equalize the pressure differential across the piston.

The spool 702 is also acted upon directly by a pair of coils 744,746 located within the bore 602. The spool 702 carries at each end a slug of magnetizable material 748,750 which is pinned to the ends of the spool to ensure a secure connection. Coils 744,746 are located within the bore 602 within a steel tube 752. The slug 748,750 is separated from the coils by a stainless steel tube 754 and the flux path completed by stationary plugs 756 held in place by an end cap 758 and a Belville washer 760.

The current supplied to the coils 744,746 is derived from the load cell 104 located within the end cap 616 and the position sensor 106 in a manner similar to that described above with respect to FIG. 6. The forces acting on the spool 702 are therefore the pressure forces from the chambers 58b, 60b and the electromagnetic forces obtained by modulating current supply to the coils 744,746 in response to signals received from the control module 38b. The operation of the actuator 22b is similar to that described above and therefore will not be described further in detail.

It should however be noted that the spring, control valve and accumulators are all accomodated within a single cylindrical body forming an integral package. The nesting of the chambers 58a, 60a reduces the overall length of the motor 22b and hence the actuator 20b allowing it to be accomodated within the area normally occupied by a spring and damper.

The valve 50b shown in FIG. 15 is simple, robust and has a very low mass allowing very fast response times to the control signals. Moreover, the accomodation of the valve within the body adjacent the motor 22b minimizes the hydraulic inertia within the system again enhancing the response of the actuator to control signals. The location of the valve 50b alongside the motor 22b also permits elongate coils 744,746 to be used without adversely impacting on the overall envelope of the actuator 20b. The elongate coils are beneficial in improving the force/current ratio of the coil.

The direct action of the coils on the spool also eliminates the pilot flow associated with the control valve 350 and so reduces the oil consumption of the system.

We claim:

1. An actuator for an active suspension system comprising a body, a first bore in said body defining a cylinder to receive a piston assembly movable relative to said body along said cylinder, a second bore in said body disposed parallel to said first bore to receive a valve operable to control flow to said cylinder, a third bore in said body disposed parallel to said first bore to provide an accumulator for pressurized fluid to be supplied to said valve, and a fourth bore in said body parallel to said first bore to receive a gas spring operable to resist movement of said piston relative to said cylinder in one direction.

2. An actuator according to claim 1 wherein said first and second bores are interconnected by a first set of internal passageways provided in said body.

3. An actuator according to claim 2 wherein said second and third bores are interconnected by a second set of internal passageways provided in said body.

4. An actuator according to claim 3 wherein said fourth and first bores are interconnected by a third set of internal passageways provided in said body.

5. An actuator according to claim 4 wherein a second partition is located in said fourth bore to subdivide said bore into a hydraulic chamber having hydraulic fluid therein and a gas chamber having gas therein.

6. An actuator according to claim 5 wherein said second partition includes a piston slidable within said fourth bore.

7. An actuator according to claim 5 wherein said hydraulic chamber is connected to said first bore by said third set of internal passageways.

8. An actuator according to claim 7 wherein said third set of internal passageways includes a radial duct extending between said hydraulic chamber and said first bore adjacent one end thereof.

9. An actuator according to claim 7 wherein said piston assembly is slidably mounted within said first bore and said hydraulic fluid is applied to one side thereof.

10. An actuator according to claim 9 wherein valve means are provided for varying the pressure of hydraulic fluid in said fourth bore.

11. An actuator according to claim 9 wherein said piston assembly is slidably mounted on a stationary support extending along said first bore and concentric therewith.

12. An actuator according to claim 11 wherein said piston assembly includes a piston rod having an internal cylinder slidably supported on said support and a piston extending radially from said piston rod and into sealing engagement with a circumferential wall of said first bore, said internal cylinder and said support cooperating to define a first motor chamber therebetween and said piston and said wall cooperating to define a second motor chamber therebetween.

13. An actuator according to claim 12 wherein said second bore is connected to each of said motor chambers by respective internal passageways to permit fluid to flow therebetween.

14. An actuator according to claim 13 wherein fluid is supplied from said second bore to said first motor chamber by an annular passage between said support and said piston rod.

15. An actuator according to claim 13 wherein said valve located in said second bore has a valve member movable along said bore to control fluid flow from said third bore to one of said motor chambers.

16. An actuator according to claim 15 wherein said valve member is movable by actuators located within said second bore.

17. An actuator according to claim 12 wherein a displacement transducer is associated with said piston rod to monitor displacement thereof relative to a datum.

18. An actuator according to claim 17 wherein said displacement transducer includes a piston member secured to said piston rod and received within a cavity within said support, movement of said rod varying the volume of said cavity to provide a signal indicative of displacement of said transducer.

19. An actuator according to claim 18 wherein said cavity is connected to a sixth bore located in said body and having a slave piston slidable therein, said cavity and bore being filled with fluid whereby displacement of said piston member produces a corresponding movement of said slave piston, and monitoring means to measure the movement of said slave piston.

20. An actuator according to claim 19 wherein said sixth bore is located adjacent to and extends into an external cavity on said body, said external cavity accommodating electronic controls associated with said valve.

21. An actuator according to claim 1 wherein a first partition is located within said third bore and is movable therein, said first partition separating hydraulic fluid from a volume of gas to provide a pressurized source of hydraulic fluid for said valve.

22. An actuator according to claim 21 wherein an internal passageway extends within said body between said second bore and third bore on one side of said first partition to connect said hydraulic fluid to said valve.

23. An actuator according to claim 22 wherein said internal passageway includes an axial duct extending parallel to said second and third bores and a pair of radial ducts extending from said axial duct to said second and third bores respectively.

24. An actuator according to claim 23 wherein one of said radial bores is located adjacent one end of said third bore.

25. An actuator according to claim 21 wherein said first partition is a piston slidable in said bore.

26. An actuator according to claim 21 wherein said third bore communicates with a fifth bore provided in said body generally parallel to said first bore to provide a reservoir of gas.

27. An actuator according to claim 26 wherein communication is provided by an axial internal passageway intermediate said third bore and fifth bore and radial ducts extend from said axial internal passageway to said third bore and fifth bore.

28. An actuator according to claim 27 wherein a pair of radial ducts extend between said axial internal passageway and said fifth bore at axially spaced locations.

\* \* \* \* \*